3,583,872
**PROTEIN RECOVERY FROM DEFATTED VEGE-
TABLE PROTEIN SOURCE MATERIAL**
Morris D. Wilding, Downers Grove, Ill., and Andrew
 Chung-yen Peng, Columbus, Ohio, assignors to Swift
 & Company, Chicago, Ill.
No Drawing. Filed Apr. 22, 1968, Ser. No. 723,257
**Int. Cl. A23j *1/14***
U.S. Cl. 99—17 8 Claims

ABSTRACT OF THE DISCLOSURE

Substantially unhydrolyzed vegetable protein is recovered from raw, defatted, vegetable protein source material by contacting the material with a solvent and subjecting it to high intensity shearing forces that disrupt the natural cell structure of the protein bodies.

---

This invention relates to the recovery of bland, substantially unhydrolyzed vegetable protein. More particularly, it concerns improvements in the hydrolytic extraction of water-soluble proteins from raw vegetable protein source material.

In the recovery of protein from raw vegetable bean material, it is customary to first crack and flake the bean followed by a solvent extraction to remove the fatty fraction. For example, soybeans can be cracked, flaked and treated with a solvent such as hexane to remove the oil. This solvent extraction process, after removal of the solvent by low temperature drying under vacuum or the use of superheated steam, etc., provides a relatively oil free protein source material. The vacuum dried or vapor desolventized protein material is then subjected to what may be called harsh isolation procedures which affect considerable denaturation of the protein molecule.

Various prior art procedures extract not only the protein but also flavoring matter, gummy or mucilaginous matter, pigmentary matter, etc. It is these non-proteinaceous materials that supply undesirable odors, tastes and colors to the isolated protein and, in effect, render it unacceptable as a food substance.

In some prior art procedures, relatively harsh alkaline solutions are used to extract the desired proteinaceous material. Such procedures possess several disadvantages. For example, extensive hydrolysis takes place coupled with the fact that the isolated proteinaceous material upon precipitation is slow in settling and difficult to handle in succeeding stages of the process.

For these reasons, another prior art process advocates a somewhat milder treatment of the soybean material. In that process, heat-treated soybean flakes are agitated with water at a temperature of between about 100° F. and 180° F., preferably between 130° F. and 160° F. under a pH of about 6 to 8 for about 1½ to 2 hours. While such a process is a distinct step forward in the art, it still possesses several disadvantages such as decreased yield and some hydrolysis due to the high temperature and length of time required for extraction. Further, the yield of protein extracted appears to be a function of the temperature of the water and increases to a maximum when the temperature is about 150° F. This temperature is critical as the yield decreases rapidly at higher temperatures due to denaturation.

Still another prior art process, while directed mainly to the production of synthetic protein-lipid complexes from raw vegetable material, teaches the use of a hammermill to induce hydrodynamic shock waves which disrupt the cell structure and free the protein and lipid fraction which in the presence of alkali combine to form a novel complex. This process is very specific and other means of exerting severe mechanical treatment fail to produce the desired complex. While hydrodynamic shock waves will tend to free the encased proteinaceous material, the resulting yield is far from being desirable as it is in the range of approximately 50% or less, based on the total available protein.

It is therefore one object of this invention to provide a process for recovering bland, substantially unhydrolyzed vegetable protein from vegetable protein source material in superior yields.

Another object of this invention is to provide a mild isolation procedure to recover substantially unhydrolyzed vegetable protein yet requires but a minimum amount of time to accomplish this purpose.

Additional objects, if not specifically set forth herein, will be readily apparent to those skilled in the art from the detailed description of the invention which follows.

In general, this invention relates to a process for recovering bland, substantially unhydrolyzed vegetable protein. The procedure comprises contacting raw vegetable protein source material with an aqueous solvent under approximately neutral pH conditions, said aqueous solvent having a temperature of not substantially in excess of 100° F., and preferably between about 40° F. and 90° F., and passing the resulting slurry through a narrow opening whereby high intensity rupturing forces disrupt the natural cell structure thereby freeing the desirable proteinaceous material. The entire product exiting through the narrow opening is centrifuged to separate cellular material from extracted protein. The residue can then be washed and recentrifuged to separate additional protein from the fibrous residue. Finally, the soluble proteinaceous material may be concentrated and kept in liquid form or precipitated by treatment with acid to form a solid product. The nutritious protein may be used per se as a food substance or may be incorporated into other food material.

More specifically, while the process is typically applied to the recovery of soya protein, it is mentioned at this time that other raw vegetable materials may be treated in accordance with the procedure of this invention so as to recover the respective water-soluble proteins therein. Typical raw material which may be utilized comprises soybeans, peanuts, castor beans, cottonseeds, sesame seeds, sunflower seeds, as well as leaves and grasses.

While the process is applicable to a wide range of vegetable material, for the sake of brevity, the invention will be described only in reference to soybeans. In this connection, the term "soybean protein source material" used throughout the specification and claims is to be construed to cover any material derived from soybeans which contains soya protein and includes whole soybeans, soybean grits, meal, flour, flakes or other subdivided particles of the soybean.

In carrying out the process, sufficient water is provided to hydrate the protein cells to their maximum and to provide a slurry-type mixture. If insufficient water is present, the material will tend to form a paste and the over-all efficiency of the extraction process will be greatly diminished. On a weight basis, the water should be present in a ratio of between about 5 to 14 parts, preferably between 8 to 10 parts for one part of soybean protein source material. When using a water to soybean material ratio of about 9:1 it is possible to recover about 65% to 75% of the available protein without adjusting the solution to an alkaline pH. On the other hand, a water to soybean ratio of about 4:1 will enable one to recover only 40% to 50% of the available protein. On the other side, a water to soybean ratio of 14 to 1 or greater will result in decreased protein recovery somewhere in the order of 35% to 45% of the available protein.

The temperature of the aqueous solvent used to hydrate the soybean material may vary, however, one of the major advantages of the instant process is that temperatures in excess of 100° F. are not required. Normally, tap water is used and hence hydrolysis of the water soluble protein does not take place. While the instant invention does not exclude the use of heated or chilled water, it is preferred to use water that is not substantially in excess of 100° F., and especially water between about 40° F. and 90° F.

In regard to the aqueous solvent used in the process, it is pointed out that no special treatment need be performed in order to get the maximum solubility. This fact should be compared with prior art processes which require harsh conditions, i.e., a pH of about 11 or more, or essentially neutral pH but extraction times of 1½ to 2 hours with the extraction water being at a temperatures of 150° to 180° F. However, this is not to say that slightly alkaline or acidic conditions are unacceptable in the instant process but merely that they are unnecessary.

After the soybean protein source material has been hydrated, it is subjected to a critical type of severe mechanical working so as to rupture the cell wall and membrane of the protein bodies (protein contained in membranes within the cell) so as to increase the speed and yield of extraction of the protein bodies. This is accomplished by passing a slurry of soybean protein source material at high centrifugal speeds through a narrow opening (about 0.003 inch to about 0.012 inch, preferable 0.005–0.008). It should be mentioned, however, that merely size reduction will not result in a system possessing rapid extraction rates. Microphotographs show the particle size of soy flour to be about 2 to 140 microns. The soy flakes treated in accordance with the procedure in this invention range between 60 microns and 160 microns. Obviously then, the particle size is not the factor in giving increased solubility.

In order to rupture the protein cell, high intensity forces are required to cause both shearing and differential pressure effects on the subcellular protein structures. Other severe mechanical workings such as ball-milling, hammer-milling, pebblemilling, crushing, flaking, etc., are insufficient to enable one to recover the protein in yields of 65% to 75% (without alkaline pH adjustment of solution) of the available protein.

In order to rupture the protein cell, it has been found that a tangential speed of the shearing blade should exceed about 2500 in./sec. and that the discharge orifice should range between 0.003 inch and 0.012 inch. A typical shear-type solublizer for this purpose is an Urschel Mill (MG model) with a micro-head attachment. Using a six inch diameter, 9000 r.p.m. will give a tangential speed of about 2830 in./sec. while 36,000 r.p.m. produces a tangential speed of around 11,290 in./sec.

By using high intensity shear-type apparatus, it was possible to increase the percent of protein in the supernatant by 12% or more over the best conditions of conventional water extraction procedures of 2 hours in length. Also, it may be mentioned that the instant process not only improves substantially the yield of protein, but shortens the time of extraction and reduces the equipment requirements for such a process; thus, reducing the over-all cost of production per unit of protein.

The rupture of the subcellular protein bodies is affected not only by a shearing effect of cellular tissue but more importantly by a momentary pressure build-up and sudden release as the material passes through the narrow restricted orifice. This momentary mechanical and pressure action disrupts the membranous material enclosing the protein, thus releasing it into solution.

The following examples are presented to illustrate the invention and they should not be taken in any manner as limiting the invention which is defined in the appended claims.

EXAMPLE I

One part of undenatured, defatted soy flakes was mixed with 9 parts of cold tap water and agitated for 5 minutes before being processed through an Urschel Mill. A micro-head attachment was affixed wherein the orifice size range was in the range of about 0.004 inch to 0.008 inch. The soybean flake-water slurry was then put through the same to rupture the protein cells. A portion of the initial mixture before passing through the micro-head was taken out as a control sample. Both the control mixture and the Urschelized sample were centrifuged at 5000 r.p.m. for 20 minutes. The supernatant was decanted and saved. The residue was washed once with a small amount of cold tap water and recentrifuged. The total protein extracted into the supernatant by the Urschel process was 69.29% compared to the control of 41.96%, thus creating a difference of 27.33% higher protein content by the instant process. Protein left in the residue of the Urschelized sample was 30.7% and that of the control 58.3%. Two other experiments using the identical procedure, as shown above, show the total protein extracted in accordance with the process of the instant invention of 69.1% and 73.1% respectively.

EXAMPLE II

One part of defatted soybean grits was mixed with 9 parts cold tap water and processed through an Urschel Mill as described in Example I. The same procedure was used in comparing a control sample taken before the Urschel process as compared with the same mixture after processing through the Urschel Mill. By analysis, the extracted protein recovered by the process of this invention was 64.86% of the available protein while the control had only 29.67% protein.

EXAMPLE III

One part of undenatured, defatted soy flour (200 mesh) was mixed with 9 parts of cold tap water and processed as described above. The same procedure was used in processing the machine sample through the Urschel Mill as described above. Chemical analysis gave a protein yield of 70.03% as compared with 59.33% in the control before the Urschel process. This example is evidence of the fact that the fineness of the cell in this particular soy application did not give the high protein yield as processing in the instant procedure.

EXAMPLE IV

One part of defatted, undenatured soy flakes was mixed with 9 parts of tap water and stirred for 30 minutes. The slurry was then centrifuged at 5000 r.p.m. for 20 minutes. The upper phase was decanted and saved. The residue was washed with an equal part of tap water and recentrifuged as described above. Chemical analysis of the combined supernatant showed an extracted yield of protein of 46.83% in the supernatant. This example shows that merely stirring and centrifuging does not extract an acceptable amount of protein.

EXAMPLE V

One part of defatted, undenatured soy flour was stirred with 14 parts of distilled water for 2 hours at room temperature. The total suspension was centrifuged at 5000 r.p.m. for 20 minutes. The centrifuged residue was extracted with 6 parts distilled water, by weight of the original sample, for one hour. This was then recentrifuged and the combined protein analyzed. The supernatant gave a 57.57% protein yield compared with the total protein in the initial sample.

EXAMPLE VI

One part of defatted, undenatured soy flour was stirred with 14 parts of tap water as described in Example V. The solution was stirred or extracted for 30 minutes, centrifuged, and then re-extracted with 6 parts of distilled water for 15 minutes. This solution was then recentrifuged and the combined supernatant gave a protein yield of 38.8%.

EXAMPLE VII

A Cowless solubilizer blade attached to a drill press was used to extract the mixture of one part of defatted undenatured soy flakes and 4 parts of tap water. The Cowles solublizer was run at high speeds for 5 minutes. The solution was centrifuged, the residue washed and the supernatant then recentrifuged. The combined supernatant gave a total extracted protein yield of 31.67%. The same procedure as described above when carried out for 10 minutes extraction time gave a protein yield of 43.83%.

EXAMPLE VIII

The solution as described in Example VII was further diluted with 5 parts of tap water making a total of one part of defatted soy flakes to 9 parts of water. After carrying out the above step of centrifugation, washing and recentrifuging, the combined supernatant extracts gave a protein yield of 38.58% for a 5 minute extraction and a 50.08% yield with a 10 minute extraction.

EXAMPLE IX

A Cowles solubilizer blade attached to a drill press was used as described above in extracting one part of defatted, undenatured soy flakes with 9 parts of tap water. The action of the Cowles solubilizer was carried out at high speeds for 10 minutes. The material was centrifuged, washed and recentrifuged in the way described in the above examples. Chemical analysis give a protein yield by this process of only 36.53%.

Obviously many modifications and variations of the invention as hereinbefore set forth may be made without departing from the spirit and scope thereof, and, therefore, only such limitations should be imposed as are indicated in the appended claims.

The embodiments of the invention in which an exclusive property or privilege is claimed are defined as follows:

1. A process for recovering bland, substantially unhydrolyzed vegetable protein which comprises contacting raw, defatted, vegetable protein source material with an aqueous solvent to form a slurry, said solvent being present in a ratio of between about 5 to about 14 parts of solvent per one weight part of defatted, vegetable protein source material, subjecting said slurry to high centrifugal speeds while passing it through a narrow shearing orifice whereby high intensity shearing forces disrupt the natural cell structure of the protein bodies, and thereafter recovering substantially unhydrolyzed protein.

2. The process of claim 1 wherein the raw vegetable protein source material is derived from defatted soybeans.

3. The process of claim 1 wherein the aqueous solvent is water having a temperature not substantially in excess of about 100° F. and is present in a weight ratio of between 8 to about 10 parts of water per one part of defatted, vegetable protein source material.

4. The process of claim 1 wherein the shearing orifice is between about 0.003 inch and 0.012 inch.

5. The process of claim 1 wherein the aqueous solvent is water at a temperature of between about 40° F. and about 90° F. and is present in a weight ratio of about 8 to 10 parts water to one part defatted, vegetable protein source material.

6. The process of claim 1 wherein the vegetable protein source material is a slurry of a member selected from the group consisting of defatted soybean flakes, defatted soybean grits and defatted soybean flour and said shearing orifice is between about 0.003 inch and 0.012 inch.

7. The process of claim 1 wherein the defatted protein source material possesses a tangential speed in excess of 2500 in./sec.

8. The process of claim 1 wherein the water is present in sufficient amount to hydrate the protein cells to the maximum.

References Cited
UNITED STATES PATENTS

| | | | |
|---|---|---|---|
| 2,928,821 | 3/1960 | Chayen | 99—4X |
| 3,346,390 | 10/1967 | Pichel et al. | 99—98 |

OTHER REFERENCES

Urschel Mills, How They Operate, Urschel Laboratories, Inc., Valparaiso, Ind., U.S.C., printed in February 1965 p. 9.

A. LOUIS MONACELL, Primary Examiner

W. A. SIMONS, Assistant Examiner

U.S. Cl. X.R.

260—123.5